United States Patent [19]

Mirra et al.

[11] 4,331,487

[45] May 25, 1982

[54] CONDUCTIVE COATINGS FOR METAL SUBSTRATES

[75] Inventors: Michael J. Mirra; Albert H. Giles, both of Greeneville, Tenn.

[73] Assignee: Ball Corporation, Muncie, Ind.

[21] Appl. No.: 147,004

[22] Filed: May 6, 1980

[51] Int. Cl.³ ............................ C23F 7/00; C23F 7/08
[52] U.S. Cl. ............................. 148/6.15 R; 148/6.24; 427/122
[58] Field of Search ................ 148/6.2, 6.15 R, 6.24; 427/122

[56] References Cited

U.S. PATENT DOCUMENTS 3,708,350  1/1973  Kennedy et al. ..................... 148/6.2

Primary Examiner—Ralph S. Kendall
Attorney, Agent, or Firm—Gilbert E. Alberding

[57] ABSTRACT

A method and composition are described for preparing metal surfaces, especially zinc, for receiving an electrically conductive coating, the preparatory composition being an aqueous solution containing about 2 to about 25 weight percent of the mixture of salts of heavy metals, an oxidizing agent, and a mineral acid. The preparatory coating has utility in battery manufacture.

A preferred preparatory coating composition for zinc-base surfaces is a solution comprising about 0.1 to 2.5 weight percent salt of a heavy metal such as ferric nitrate, about 0.01 to about 3.5 weight percent of an oxidizing agent such as sodium or potassium persulfate, about 2 to about 20 weight percent of a mineral acid such as sulfuric acid (98%) or phosphoric acid (75%), and the remainder water. Another preferred preparatory coating composition for metal surfaces including zinc and zinc-base alloys is an aqueous solution consisting of about 0.1 to 2.5 weight percent salt of a heavy metal, about 0.01 to about 3.5 weight percent oxidizing agent, about 2 to about 20 weight percent of a mineral acid, and the remainder water.

3 Claims, No Drawings

CONDUCTIVE COATINGS FOR METAL SUBSTRATES

BACKGROUND OF THE INVENTION

1. Field of the Invention

The present invention relates to dry cell plates in which specified chemical compositions are used as active materials for forming electrodes, especially where electrodes of zinc or zinc-base alloys are employed and, more particularly, it relates to chemical preparatory coatings for zinc-containing metals using essentially aqueous solutions to form with zinc surfaces an intermediary layer having significant properties including very low resistivities, high adhesion, and coupling characteristics.

2 Description

2. Description of the Prior Art

It has long been known that conversion coatings can be created on metals, especially zinc, steel, iron, aluminum and their alloys, by means of chemical surface treatment. Aqueous chemical preparatory or coating solutions of specific compositions have been used for this purpose. For example, the formation of coatings on metal often results from the chemical intereaction between acidic solutions and the metal surface, such as in an etching process. Admittedly, particular industrial significance has accrued over the years to these sundry chemical treating processes which include phosphating, chromating, oxalating, alkaline oxidation and the like.

With particular reference to zinc and its various alloy forms it has been customary heretofore in the manufacture of battery plates and, especially for those used in the production of zinc dry cells, that the zinc metal be pretreated to make it more receptive to conductive overlayers. As a matter of fact, zinc and its alloys are used rather extensively in the battery industry. It is known that zinc is electrochemically active, shows high hydrogen overvoltage, is low polluting and is still low priced; accordingly, it is suitable as an electrode material giving high energy density, high output, low self-discharge, low pollution and low price.

It has been the practice in the past to merely employ roughening and/or cleaning means over the metal surface in order to make it properly receptive to an overcoating of an electrical conducting material, this latter coating being often carbon or graphite-containing compositions. The commercially accepted procedure in the past has been to simply pit or indent the metal surface by exposing the metal to a mechanical roughening process such as sand blasting which has been the conventional technique employed in the preparation of stock materials for battery electrodes. Such stock materials are roughened by simply blasting them with the abrasive with attendent removal of surface metal and any oxides, along with residual materials. It is known that while sand blasting treatment produces a surface which provides a better adhesion surface for metals such as zinc than one that is untreated, the adhesion characteristics are generally only moderately good and therefore far from being completely satisfactory. Other disadvantages of the conventional practice of sand blasting is that it often allows abrasive particles to be imbedded in the metal surface, that it is costly, time consuming, noisy, inconvenient and that it could present a health hazard. The subject invention attempts to circumvent these problems and at the same time provide a straightforward procedure for treating metal surfaces used in battery plates in that, inter alia, it offers an improved method for bonding electrically conducting materials to metals. Seemingly, attempts in the past to form appropriate coatings have not been pursued for one reason or another. Moreover, if there have been attempts, they have often failed because such treatments did not adhere well or they interfered with the interplay of electrical phenomena associated within the working battery cell.

Thus, although surface roughening generally has been utilized, chemical pretreatment methods wherein solutions of various compositions are employed have generally not been widely resorted to in the art.

U.S. Pat. No. 2,860,039 to Marguller et al. describes graining of zinc metals for lithographic plates by employing 1 to 5 weight percent mineral acids, 1 to 10 weight percent hydrogen peroxide and the remainder water.

U.S. Pat. No. 3,620,770 to Yoshikara et al. teaches a chromate conversion coating for zinc for receiving paint, the coating solution being an aqueous acid solution containing hydrazine and ions of chromium and iron.

There are many electrically conductive coating compositions which can be used as conductive overlayers on zinc electrodes used in dry cells. Most of these consist essentially of a chemically stable, film forming organic polymer or binder blended with electrically conductive fillers such as finely dispersed graphite or carbon. A requirement of the fillers is that they be capable of conducting current without interfering with the basic electrochemical reactions taking place in the battery. Because of this, most finely dispersed metallic fillers as conducting materials cannot be used. The carbon-polymer conductive coatings are applied over the prepared zinc surfaces normally to a dry film thickness of about between 3 and 5 mils. The purpose of such a coating is to prevent chemical attack on the zinc surface by the battery electrolyte and to conduct current being generated within the cell. As a result, this requires that the conductive coating maintain good adhesion to the zinc surface and to retain low electrical resistivity throughout the life of the battery.

SUMMARY OF THE INVENTION

It is a main object of this invention to provide a composition that will eliminate the need for mechanical roughening that has been used heretofore in the trade.

It is yet another object of this invention to provide a zinc electrode having low resistivity to electrical energy.

It is another object of this invention to provide a method of treating zinc and zinc-base alloys for battery cells by a chemical treatment that will enhance the adherence of a conducting overcoating without significant loss in electrical conductivity.

It is an object of this invention to provide a preparatory chemical conversion coating composition which can be readily applied to metal surfaces and, in particular zinc and zinc-base alloys, which when overcoated with a conductive coating exhibits resistivities of less than 0.2 ohms per square inch.

Briefly and in accordance with the invention, the above objects are obtained by treating the metal to be formed in battery stock in its broadest aspect with an aqueous solution containing salts of a heavy metal, an oxidizing agent, and a mineral acid. The invention is predicated upon the discovery that this aqueous solution deposits a very thin layer upon the metal surface that will maintain an electrically conductive overlayer without loss of adhesion and electrical properties.

A preferred preparatory coating composition for zinc-base surfaces is a solution comprising of about 0.1 to 2.5 weight percent salt of a heavy metal such as ferric nitrate, about 0.01 to about 3.5 weight percent of an oxidizing agent such as sodium or potassium persulfate, about 2 to about 20 weight percent of a mineral acid such as sulfuric acid (98%) or phosphoric acid (75%), and the remainder water. Another preferred preparatory coating composition for metal surfaces including zinc and zinc-base alloys is an aqueous solution consisting of about 0.1 to 2.5 weight percent salt of a heavy metal, about 0.01 to about 3.5 weight percent oxidizing agent, about 2 to about 20 weight percent of a mineral acid, and the remainder water.

In carrying out this invention, it is important that the metal stock be cleaned and free of surface imperfections. Generally, it is preferred that the stock be treated by first cleaning it with a light abrasive and absorbent material, such as pumice, to remove any residual oils and the like. Thereafter, the stock is rinsed with water and then contacted with the preparatory solution herein described. The treated stock is thereafter rinsed and dried and finally coated with a conductive overcoating.

In general, the metal to be treated can be coated by means conventional to the art including immersion, flooding or spraying. In carrying out the subject invention, it is customary to proceed by producing a preparatory solution of the herein described composition by dissolving the required starting chemicals into a bath or tank of a continuous spraying apparatus wherein the stock material is conveyed therethrough. The contact time is variable but depends to some extent upon the concentration and temperature of the solution and its mode of application. Depending upon the degree of coating desired, the contact time may be varied over a wide range. In general, the desired covering of the coating or layer formation takes place within a brief period of time, say about 0.5 to 2 minutes at ambient temperature. After coating, the treated metal is dried. Drying may be done by any conventional means.

The amount of chemical preparatory coating formed on the zinc surface can be varied or controlled by concentration, temperature, application times and methods. As mentioned previously, the main function of a preparatory or conversion coating is to enhance adhesion of the conductive overlayer coating and that this should be accomplished without increasing the electrical resistivity of the zinc-coating system. It has been found that too heavy a preparatory coating may provide excellent adhesion but can increase resistivity. For example, phosphoric acid containing coatings if applied to zinc surfaces results in surface phosphate levels of about 300-600 micrograms per square inch that significantly raise the resistivity to about 1 ohm/in$^2$. In general, it has been found that surface phosphate levels applied on zinc at about 10-60 micrograms per square inch provide good adhesion without seriously effecting the resistivity of the zinc-conductive coating system.

After the preparatory or conversion coating is applied and formed, the metal is coated with the electrically conductive coating. Generally, these compositions are carbon-containing compositions and include graphite or carbon. These coatings are applied over the preparatory conversion coating and have generally a thickness of about 3 to 5 mils.

Aside from the simplicity, the method of the invention has the advantage that the surface of the metal is much less roughened than in mechanical pretreating processes. The adhesion of the conductive overlayer to the metal achieved by this method is correspondingly better than that obtained by mechanical roughening, e.g., sand blasting.

To illustrate the compositions of the subject invention, the following is given. In all cases the zinc sheets were pre-cleaned by mechanical means using a 3F pumice slurry which was brushed over the zinc surface. The cleaned zinc sheets were then rinsed with water and a formulation in accordance with this invention was spray applied to the sheets at room temperature for about 30 seconds. The zinc sheets were then water rinsed and dried using air blowers. The treated zinc sheets were thereafter coated with an electrical conductive coating. The coated sheets were then baked in an infrared oven for about 2.5 minutes to a temperature of about 230° F. Approximately 1 mil of dry coating thickness was applied per coating pass. Multiple passes can be used to achieve thicker coatings if desired. The coated sheets were then tested for adhesion and electrical resistivity.

| | Formulation I |
|---|---|
| 122g | Sulfuric Acid (98%) |
| 50g | Sodium Perborate |
| 4g | Ferric Nitrate |
| .02g | Non-ionic wetting agent* |
| 1000g | Water |
| | Formulation II |
| 30g | Sulfuric Acid (98%) |
| 10g | Potassium Persulfate |
| 4g | Ferric Nitrate |
| .01g | Non-ionic wetting agent* |
| 1000g | Water |
| | Formulation III |
| 122g | Sulfuric Acid (98%) |
| 33g | Potassium Persulfate |
| 4g | Ferric Nitrate |
| .02g | Non-ionic wetting agent* |
| 1000g | Water |
| | Formulation IV |
| 100g | Phosphoric Acid (75%) |
| 33g | Potassium Persulfate |
| 4g | Ferric Nitrate |
| .02g | Non-ionic wetting agent* |
| 1000g | Water |

*Igepal CO-710 - GAF Corp.

The above four formulations were found very effective in bonding a conventional electrically conductive coating. The conductive composition employed thereover was a conventional composition and consisted essentially of:

| | |
|---|---|
| 100 parts by weight | Carboxylated Vinyl Resin (High molecular weight copolymer of vinyl chloride, vinyl acetate and maleic acid) |
| 50 parts by weight | Carbon black (acetylene black) |
| 50 parts by weight | Graphite powder |
| 800 parts by weight | Solvent - Methyl Cellosolve Acetate |

CONDUCTIVITY OR RESISTIVITY

The method employed on the conductive coated zinc sheets involves the utilization of a mercury pool resistance tester wherein a pool of mercury is placed in contact with a known area (1 in$^2$) of the coated zinc test specimen. A constant current is allowed to flow via a terminal through the mercury and across the mercury/sample interface and out through a brass plate clamped against the back of the test sample to a volt meter and power supply. The resistivity for each test specimen is thereby determined.

Two tests are used and have significance relative to the possible end use of conductive coated zinc sheets as anodes in zinc dry cell. One relates to the electrical conductivity or resistivity of the coated zinc and the other relates to the ability of the coating to maintain its bonding or adhesion to the zinc when submerged under a battery electrolyte solution. Test procedures evaluating these two properties of the coated zinc were used to compare and evaluate various surface treatment of zinc in accordance with this invention.

It has been found that the chemical preparatory coatings produced by the disclosed formulations result in lower electrical resistivities when compared with the mechanically prepared surfaces, e.g. sand blasting. Thus, for example, when the same conductive coating formulation is applied at the same thickness on sand blasted zinc surfaces and chemical covered surfaces (e.g. Bath #IV), the following average resistivities were obtained:

| Electrical Resistivity | Sand Blasted Surface | Conversion Coated Surface Bath IV |
| --- | --- | --- |
| ohms/in$^2$ | 0.689 ohms/in$^2$ | 0.135 ohms/in$^2$ |

ADHESION TEST

Approximately one inch squares of the coated zinc sheets are immersed at room temperature in the following electrolyte solution:
100 g Zinc Chloride
50 g Amonium Chloride
0.5 g Mercuric Chloride
Water to 500 ml The coated zinc squares are allowed to stay immersed in the electrolyte solution for varying periods of time. The samples are removed every 24 hours and examined for signs of peeling or of coating lift-off from the zinc particularly at the edges.

It has therefore been demonstrated that zinc surfaces treated with the chemical preparatory coatings disclosed, produces both superior adhesion and lower electrical resistivities when compared to mechanically roughened surfaces. The chemical coatings have not only performance advantages over sand blasting but are less expensive to apply and are more controllable.

What is claimed is:

1. A method of producing a preparatory coating on zinc-base surfaces comprising contacting said surfaces with a solution containing 0.1 to 2.5 weight percent salt selected from the group consisting of iron nitrate, nickel nitrate and copper nitrate, 0.01 to 3.5 weight percent of an oxidizing agent selected from the group consisting of perborates, peroxides, persulfates and perchlorates, 2 to 20 weight percent of a mineral acid selected from the group consisting of sulfuric acid and phosphoric acid and the remainder water, drying the contacted surface and thereafter applying an electrically conductive coating thereon.

2. A method according to claim 1 wherein the electrically conductive coating is a carbon-containing material.

3. A method according to claim 1 wherein the carbon-containing material includes graphite.

* * * * *